United States Patent
Gya

(10) Patent No.: US 10,718,115 B2
(45) Date of Patent: Jul. 21, 2020

(54) ELONGATED COMPOSITE PROFILE

(71) Applicant: Øglaend System AS, Kleppe (NO)

(72) Inventor: Arne Gya, Bryne (NO)

(73) Assignee: Øglaend System AS, Kleppe (NO)

( * ) Notice: Subject to any disclaimer, the term of this patent is extended or adjusted under 35 U.S.C. 154(b) by 9 days.

(21) Appl. No.: 16/223,319

(22) Filed: Dec. 18, 2018

(65) Prior Publication Data

US 2019/0203471 A1 Jul. 4, 2019

Related U.S. Application Data

(62) Division of application No. 15/555,130, filed as application No. PCT/NO2016/050041 on Mar. 9, 2016, now Pat. No. 10,202,769.

(30) Foreign Application Priority Data

Mar. 10, 2015 (NO) .................................. 20150311

(51) Int. Cl.
*E04G 21/18* (2006.01)
*F16B 7/18* (2006.01)
(Continued)

(52) U.S. Cl.
CPC .............. *E04C 3/29* (2013.01); *E04G 21/18* (2013.01); *H02G 3/263* (2013.01); *E04B 1/5831* (2013.01); *E04B 2001/2451* (2013.01); *E04C 2003/046* (2013.01); *E04C 2003/0413* (2013.01); *E04C 2003/0439* (2013.01); *F16B 7/187* (2013.01)

(58) Field of Classification Search
CPC ................ E04C 3/29; E04C 2003/046; E04C 2003/0439; E04C 2003/0413; H02G 3/263; E04G 21/18; E04B 2001/2451; E04B 1/5831; F16B 7/187
See application file for complete search history.

(56) References Cited

U.S. PATENT DOCUMENTS 4,509,806 A 4/1985 Dudouyt
4,557,091 A * 12/1985 Auer ..................... F16B 5/0052
52/282.3
(Continued)

FOREIGN PATENT DOCUMENTS

EP 0994664 4/2000
EP 1852662 11/2007
(Continued)

OTHER PUBLICATIONS

Norwegian Search Report, Norwegian Patent Application No. 20150311, dated Aug. 28, 2015.
(Continued)

*Primary Examiner* — Lee A Holly
(74) *Attorney, Agent, or Firm* — Andrus Intellectual Property Law, LLP

(57) ABSTRACT

An elongated composite profile comprising a first flange and a second flange, the first flange and the second flange together forming an L-profile, and each of the flanges, inside the L-profile, having been given a first rib and a second rib, respectively, and the first flange, the second flange, the first rib and the second rib forming a longitudinal closed channel in the composite profile and a method for mounting the same.

4 Claims, 6 Drawing Sheets

(51) Int. Cl.
*E04C 3/29* (2006.01)
*H02G 3/00* (2006.01)
*E04C 3/04* (2006.01)
*E04B 1/58* (2006.01)
*E04B 1/24* (2006.01)

(56) References Cited

U.S. PATENT DOCUMENTS

| | | |
|---|---|---|
| 4,643,319 A | 2/1987 | Debus et al. |
| 6,341,458 B1 | 1/2002 | Burt |
| D630,340 S | 1/2011 | Southwell |
| 2018/0038106 A1 | 2/2018 | Gya |

FOREIGN PATENT DOCUMENTS

| | | | | |
|---|---|---|---|---|
| EP | 3067485 A1 | * | 9/2016 | ............... E04B 7/04 |
| GB | 2205875 | | 12/1988 | |
| NO | 074325 | | 4/1998 | |

OTHER PUBLICATIONS

International Search Report, PCT/NO2016/050041, dated Jun. 6, 2016.
Written Opinion, PCT/NO2016/050041, dated Jun. 6, 2016.
Extended European Search Report, EP Patent Application No. 16762039.2, dated Oct. 23, 2018.

* cited by examiner

ELONGATED COMPOSITE PROFILE

CROSS-REFERENCE TO RELATED APPLICATIONS

This application is a divisional application of U.S. patent application Ser. No. 15/555,130, filed Sep. 1, 2017. The '130 patent application is the U.S. national stage application of International Application PCT/NO2016/050041, filed Mar. 9, 2016, which international application was published on Sep. 15, 2016, as International Publication WO 2016/144188 in the English language. The International Application claims priority of Norwegian Patent Application No. 20150311, filed Mar. 10, 2015. The above-referenced applications are all incorporated herein by reference, in entirety.

FIELD

This invention relates to an elongated composite profile which includes a first flange and a second flange, the first flange and the second flange together forming an L-profile.

BACKGROUND

Composite materials, for example in the form of or including combinations of glass, coal, or aramid fibres in a binder typically made from polyester, epoxy or polyurethane, are constantly gaining ground as load-bearing structures.

In relation to metallic materials, composite materials often have a lower modulus of elasticity and are therefore subjected to a larger deflection under load conditions otherwise the same.

Angle sections have several favourable qualities which have led to their being used in load-bearing structures of various kinds. Angle sections have relatively good bending stiffness in two planes and they are easy to join together, for example by means of bolts, because there is good access to the flanges of the angle section. One of the main weaknesses of the angle section is its relatively poor torsional rigidity, which, in many structures, calls for the use of other profiles. Alternatively, a more complicated design of the structure may remedy the weakness.

Hollow profiles have a relatively good torsional rigidity both when made as circular pipes and when made as rectangular pipes. However, it is relatively complicated to bolt pipes, even rectangular pipes, together because the access to, for example, nuts that are inside the pipe may be conditional on a larger access hole being drilled into the opposite side of the pipe. Sometimes spacer sleeves are used inside the pipe when through bolts are used in the pipe. Both embodiments weaken the load-carrying capacity of the pipe.

Composite profiles are often made with a predominant portion of longitudinal fibres. Therefore they have relatively low tearing strength near their end portions.

SUMMARY

The invention has for its object to remedy or reduce at least one of the drawbacks of the prior art or at least provide a useful alternative to the prior art.

The object is achieved through the features which are specified in the description below and in the claims that follow.

A composite profile is provided, which, in addition to an L-profile, also includes a closed longitudinal channel. The composite profile combines the favourable bending stiffness of the L-profile with the favourable torsional rigidity of the pipe.

The composite profile is designed to be bolted together at angle attachments without bolts having to be passed through the channel, whereby weakening the load-bearing capacity of the composite profile is avoided.

A drilling template is proposed and an indication of a method is given to ensure that the bolt hole of the composite profile is always drilled in the desired position in the composite profile.

The invention is defined by the independent claims. The dependent claims define advantageous embodiments of the invention.

In a first aspect, the invention relates more specifically to an elongated composite profile including a first flange and a second flange, the first flange and the second flange together forming an L-profile, and the composite profile being characterized by each of the flanges, inside the L-profile, being given a first rib and a second rib, respectively, and the first flange, the second flange, the first rib and the second rib forming a longitudinal closed channel in the composite profile. At least one of the ribs is narrower than its remote flange. Inside the channel, at least one of the flanges is formed with a longitudinal nut-bed groove.

By forming at least one of the ribs narrower than the remote flange thereof, room is made for bolt holes and associated bolts in the flange outside the channel. This is particularly favourable when the bolt hole has to be placed at a distance from the end portion of the composite profile.

When a bolt hole has been drilled in the desired place in the channel, a nut which is placed in the nut-bed groove will be prevented from rotating, which facilitates the mounting work to a substantial degree.

At least one of the flanges may be provided with a drilling groove. The drilling groove indicates where it is favourable to place a bolt hole and also forms a guide for a drill that is used to drill the bolt hole.

A drilling template may have been prepared for the drilling of bolt holes in the composite profile, the drilling template being provided with a channel symbol to mark a bolt hole which is always to be at the end of the channel belonging to a vertical composite profile and a horizontal composite profile that together form an angle attachment.

Thus, a favourable relative position is indicated for a bolt hole which is to end in the channel. At the same time, it is ensured that the bolt hole in question matches a corresponding bolt hole in an adjacent composite profile.

There is also described a second aspect of the invention wherein the invention relates more specifically to a method for mounting two elongated composite profiles at a right angle, the method being characterized by including:

producing a composite profile with a first flange and a second flange, the first flange and the second flange together forming an L-profile, each of the flanges, inside the L-profile, being given a first rib and a second rib, respectively, and the first flange, the second flange, the first rib and the second rib forming a longitudinal closed channel in the composite profile;

placing a drilling template on the profiles, the drilling template being provided with a channel symbol to mark a bolt hole which is always to be at the end of the channel belonging to a vertical composite profile and of a horizontal composite profile that together form an angle attachment; and bolting together the angle attachment with bolts extending through the bolt holes drilled according to the drilling template.

The terms vertical composite profile and horizontal composite profile are used to explain the mounting process of a relatively common U- or L-shaped hanger. This does not imply a limitation on the scope of coverage of the document.

The method may include marking drilling holes which are to be drilled only in vertical composite profiles, with a vertical symbol. Reference is made to the special part of the document for a detailed description of the method.

The method includes positioning a nut that is in the channel in a nut-bed groove to prevent the nut from rotating during tightening.

The method may include placing and bolting a reinforcement composite profile invertedly on the horizontal composite profile and against the vertical composite profile. This is particularly appropriate in the case of an L-shaped hanger in which a juncture between the vertical composite profile and the horizontal composite profile is subjected to greater strains than in a corresponding U-shaped hanger.

In some cases it may be appropriate to arrange a bolt further into the channel, where the access to an ordinary nut is limited. An extended nut may then be used. The extended nut which is inserted into a bore in the first or second rib will stop against the nut-bed groove. A shoulder on the extended nut may stop against the first rib. Preferably, the extended nut is externally hexagonal, fitting in the nut-bed groove, the bore having a larger diameter than the bolt hole.

The composite profile and the method according to the invention solve a long-felt problem particularly connected to hanger suspensions of cable trays and pipes. The composite profile and the method provide a simple and cost-effective solution which may be put to use immediately by installation personnel.

BRIEF DESCRIPTION OF THE DRAWINGS

In what follows, an example of a preferred embodiment and method is described, which is visualized in the accompanying drawings, in which.

DETAILED DESCRIPTION OF THE DRAWINGS

Figure 1:
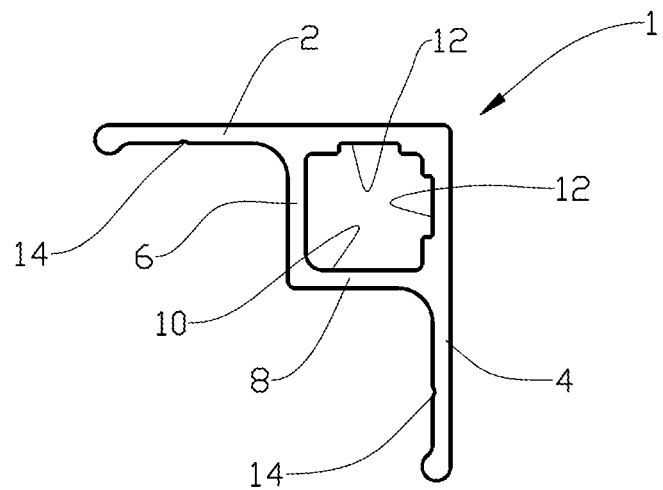
FIG. 1 shows an end view of a composite profile according to the invention.
Figure 2:
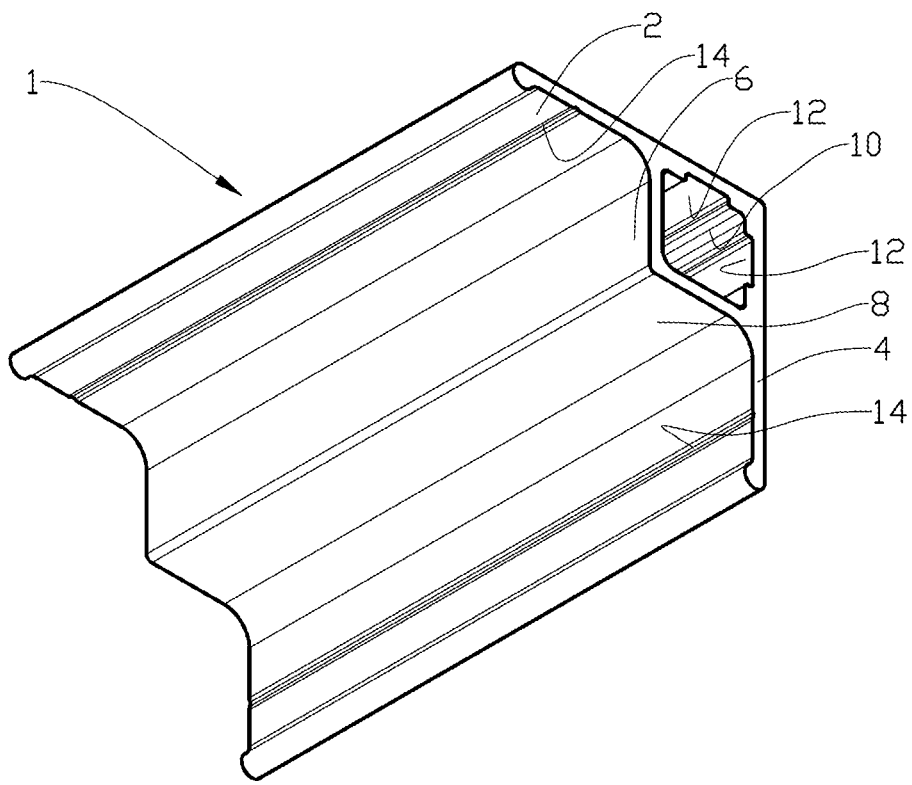
FIG. 2 shows the composite profile in perspective.
Figure 3:
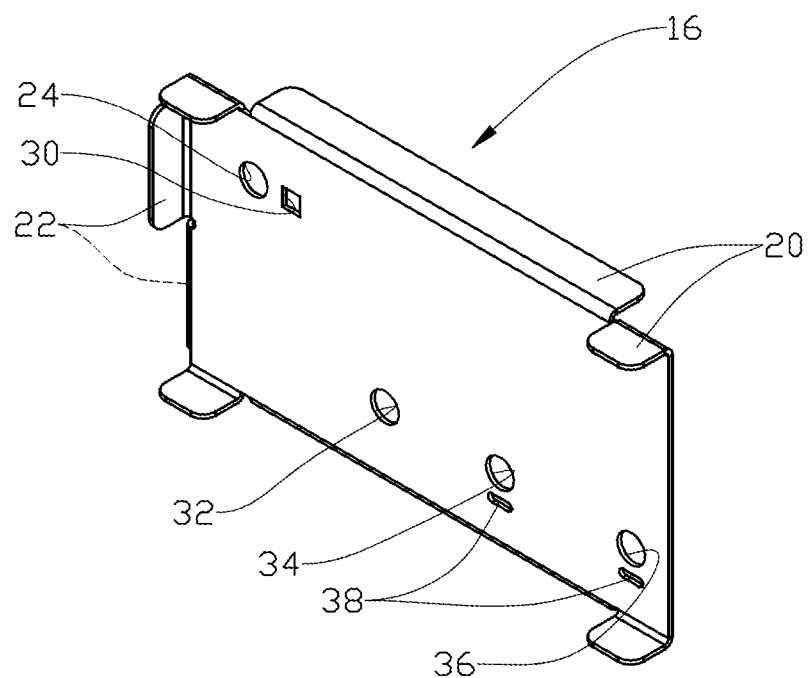
FIG. 3 shows a drilling template adapted to the composite profile.

In the drawings, the reference numeral 1 indicates a composite profile which comprises a first flange 2 and a second flange 4, together forming an L-profile. A first rib 6 projects inwards from the first flange 2, and a second rib 8 projects inwards from the second flange 4. Together, part of the first flange 2, part of the second flange 4, the first rib 6 and the second rib 8 form a closed channel 10 extending along the composite profile 1.

The first rib 6 is narrower than the remote second flange 4, and the second rib 8 is narrower than the remote first flange 2.

Inside the channel 10, the first flange 2 and the second flange 4 are formed with an elongated nut-bed groove 12 each. Outside the channel 10, each of the first flange 2 and the second flange 4 is formed with a respective longitudinal drilling groove 14.

A drilling template 16 is designed to rest externally on the flanges 2, 4 against the end portions 18 of the composite profile 1. The drilling template 16 is provided with lateral stops 20 and end stops 22 which are arranged to keep the drilling template 16 in the correct position on the composite profile 1 during drilling.

The drilling template 16 is designed to be used from both sides, depending on which end portion 18 and flange 2, 4 of the composition profile 1 is to be drilled.

A first template hole 24 is arranged in such a way that a bolt hole 26 which is drilled via the first template hole 24 will end in the right position in the channel 10. The first template hole 24 positions said bolt hole 26 in such a way that it will be at a sufficient distance within the composite profile 1 to resist tearing, while, at the same time, a nut 28 can relatively easily be positioned over the bolt hole 26 in the channel 10; see FIGS. 7 and 9. When the nut 28 is in the nut-bed groove 12, it is prevented from rotating during the screwing-together.

A channel symbol 30 is arranged in the drilling template 16 at the first template hole 24 to indicate that the first template hole 24 must always be placed over the channel 10. The first template hole 24 is closer to the end stop 22 than to the opposite end portion of the drilling template 16.

A second template hole 32 is arranged to position a bolt hole 26 in the relevant flange 2, 4 outside the channel 10.

A third template hole 34 and a fourth template hole 36 are marked with vertical symbols 38.

Figure 4:
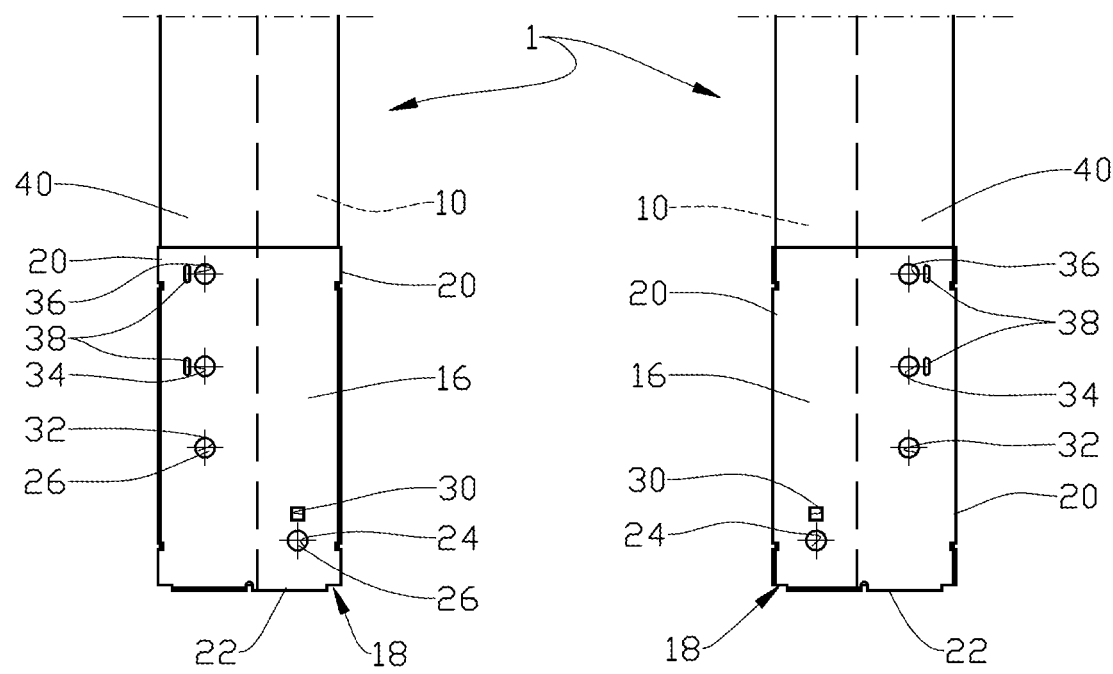
FIG. 4 shows the drilling template positioned on vertical composite profiles.

FIG. 4 shows a pair of composite profiles 1 forming vertical composite profiles 40, there being a drilling template 16 positioned on each of the end portions 18. The end stop 22 is resting against the composite profile 1 and the first template hole 24 is positioned over the channel 10 of the composite profile 1.

Figure 6:
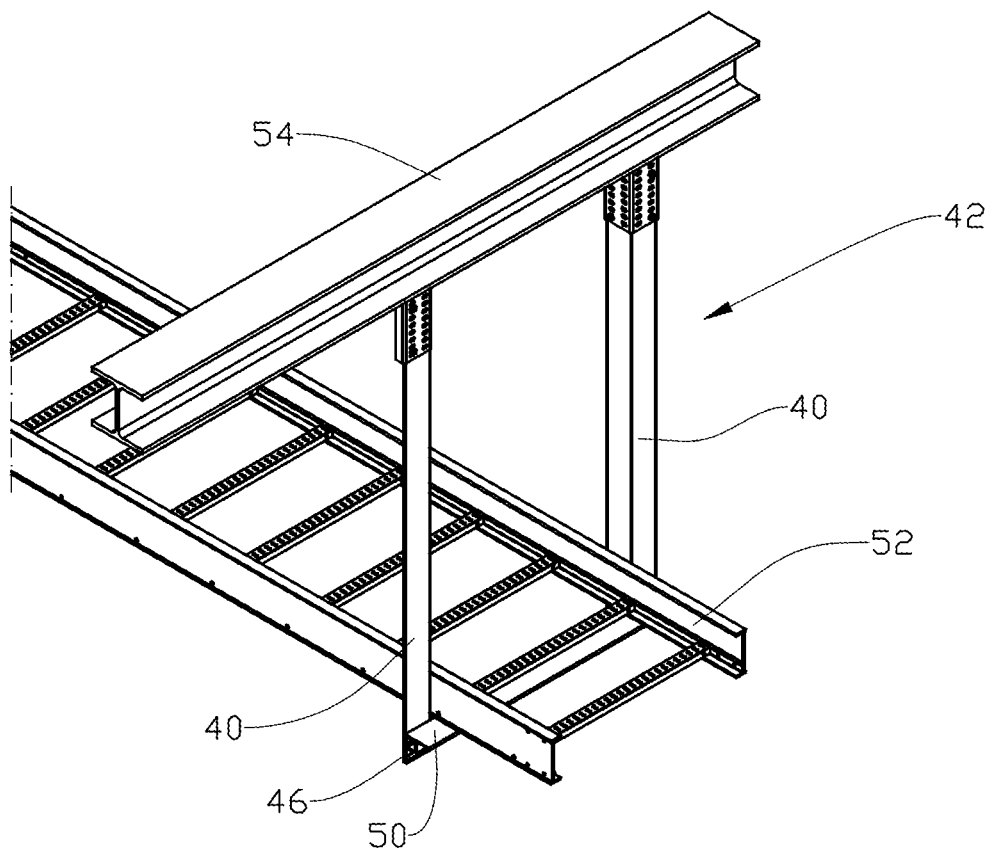
FIG. 6 shows, in perspective and on a smaller scale, a cable tray hung in a U-shaped hanger.

By drilling through the first template holes 24 and the second template holes 32, the vertical composite profiles 40 are prepared for use in a U-shaped hanger 42 as shown in FIG. 6.

Figure 8:
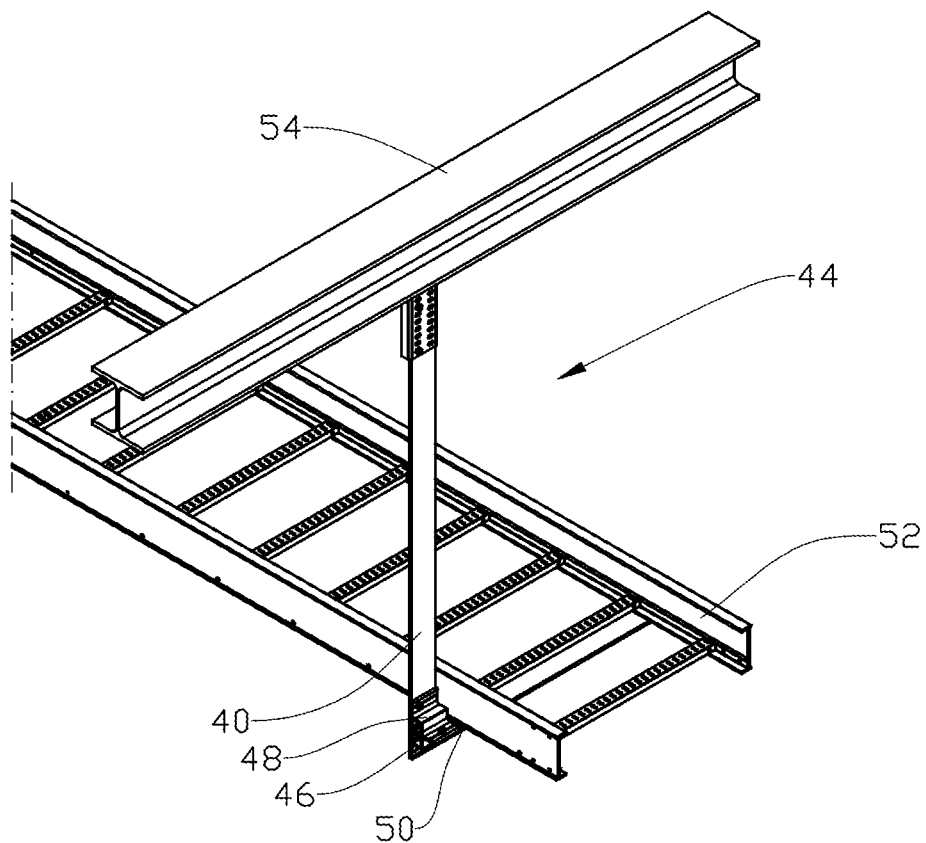
FIG. 8 shows, in perspective and on a smaller scale, a cable tray which is hung on an L-shaped hanger.

If the vertical composite profile 40 is to be used in an L-shaped hanger 44 as shown in FIG. 8, in which it may be appropriate to reinforce an angle attachment 46 with a composite profile 1 in the form of a reinforcement composite profile 8, the third and fourth template holes 34, 36 which are marked with vertical symbols 38 must be used as well.

Figure 5:
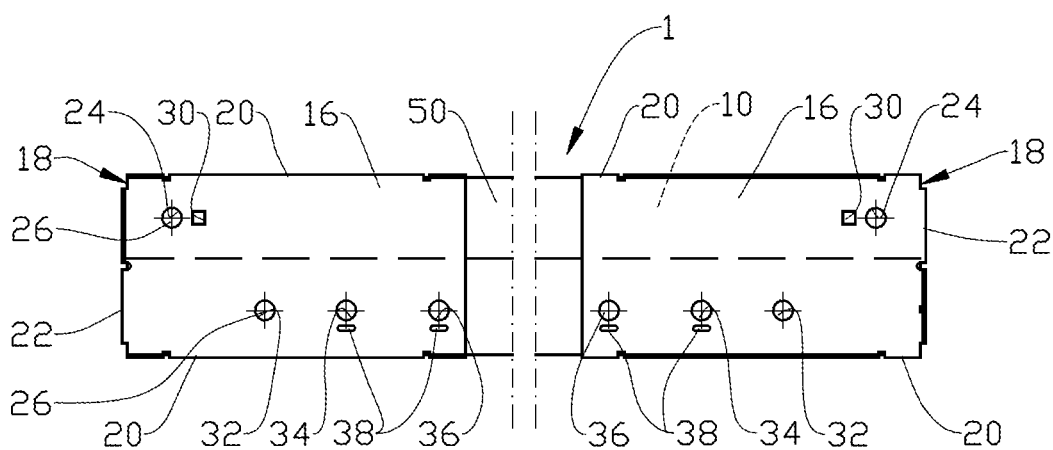
FIG. 5 shows the drilling template positioned on a horizontal composite profile.

Correspondingly, a composite profile 1 embodied as a horizontal composite profile 50 is shown in FIG. 5. Here, too, the end stops 22 of the drilling templates 16 are resting against the horizontal composite profile 50, the first template holes 24 being arranged over the channel 10.

By drilling through the first and second template holes 30, 32 at both end portions 18 of the horizontal composite profile 50, the horizontal composite profile 50 will fit in the U-shaped hanger 42 of FIG. 6.

If the horizontal composite profile 50 is to be used in the L-shaped hanger 44 of FIG. 8, only the right-hand end portion 18 is drilled if it is the left-hand vertical composite profile 40 of FIG. 4 that is to be used. There is no point in drilling through the third template hole 34 or the fourth template hole 36 in the horizontal composite profile 50.

When the U-shaped hanger 42 is to be mounted, for example to carry a cable tray 52, the vertical composite profiles 40 are attached to a load-bearing structure 54 in a manner known per se. The bolt hole 26 which has been positioned by means of the first template hole 24 in the horizontal composite profile 50 matches to the bolt hole 26 which has been positioned by means of the second template hole 32 in the vertical composite profile 40. At the same time, the bolt hole 26 which has been positioned by means of the first template hole 24 in the vertical composite profile 40 matches the bolt hole 26 which has been positioned by means of the second template hole 32 in the horizontal composite profile 50.

Figure 7:
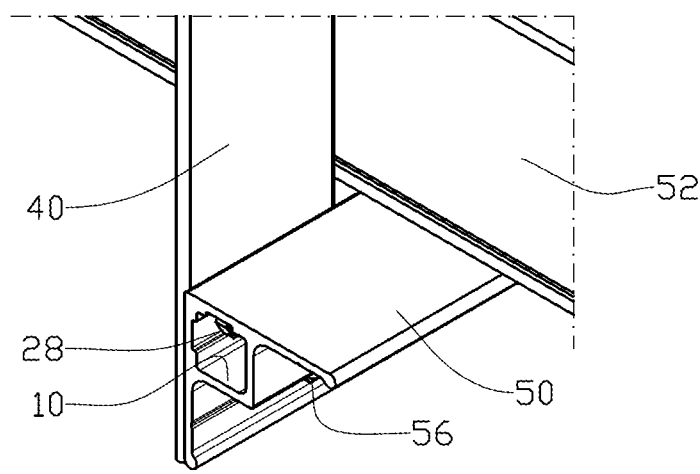
FIG. 7 shows a section of FIG. 6 on a larger scale.

The angle attachments 46 are screwed together by means of bolts 56 and nuts 28; see FIG. 7.

Figure 9:
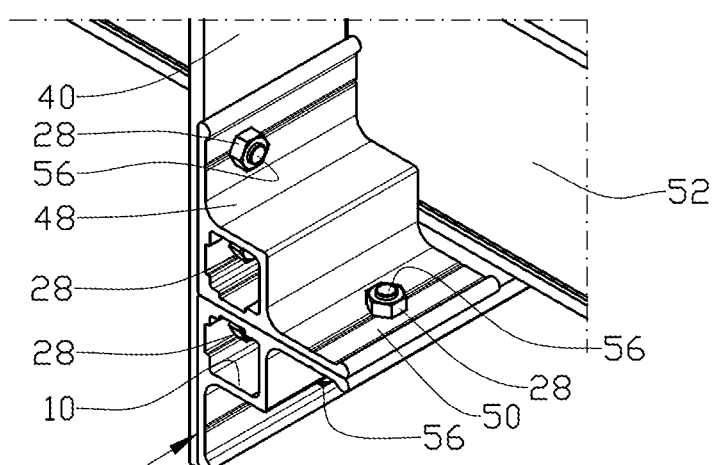
FIG. 9 shows a section of FIG. 8 on a larger scale.
Figure 10:
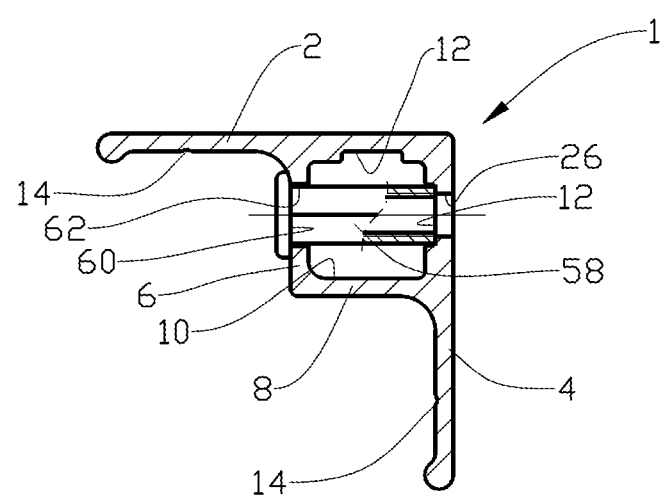
FIG. 10 is an end view of the composite profile, showing a bolt arranged in the channel.

Correspondingly, the L-shaped hanger is screwed together as shown in FIGS. 8 and 9. Here, the angle attachment 46 is reinforced with the reinforcement composite profile 48. It is attached to the vertical composite profile 40 and to the horizontal composite profile 50 in a manner corresponding to that described above.

If it is appropriate to arrange a bolt 56 further into the channel 10, where the access to an ordinary nut 28 is limited, an extended nut 58 may be used. The extended nut 58 which has a shoulder 60 has been inserted into a bore 62 in the first rib 6 and into abutment in the nut-bed groove 12. At the same time, the shoulder 60 is resting against the first rib 6. The bore 62 has been bored open and has a larger diameter than the bolt hole 26.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An elongated composite profile comprising a first flange and a second flange, the first flange and the second flange together forming an L-profile, wherein:
   each of the flanges, inside the L-profile, have been given a first rib and a second rib, respectively, and the first flange, the second flange, the first rib and the second rib form a longitudinal closed channel in the composite profile;
   at least one of the ribs is narrower than its remote flange; and
   inside the channel, at least one of the flanges is formed with a longitudinal nut-bed groove.

2. The elongated composite profile according to claim 1, wherein at least one of the flanges is provided with a drilling groove.

3. The elongated composite profile according to claim 1, wherein an extended nut has been passed through a bore in the first or second rib into abutment in the nut-bed groove.

4. The elongated composite profile according to claim 1, wherein a drilling template has been prepared for the drilling of bolt holes in the composite profile, the drilling template being provided with a channel symbol to mark a bolt hole which is always to lead into the end of the channel belonging to a vertical composite profile and a horizontal composite profile that together form an angle attachment.

* * * * *